United States Patent [19]

Russel

[11] 4,169,674

[45] Oct. 2, 1979

[54] RECIRCULATING SHEET FEEDER

[75] Inventor: Matthew J. Russel, Rochester, N.Y.

[73] Assignee: Eastman Kodak Company, Rochester, N.Y.

[21] Appl. No.: 647,683

[22] Filed: Jan. 8, 1976

Related U.S. Application Data

[63] Continuation of Ser. No. 523,610, Nov. 13, 1974, abandoned.

[51] Int. Cl.² .................... G03G 15/00; B65H 3/00; B65H 9/06; B65H 29/00
[52] U.S. Cl. ...................................... 355/14; 271/3.1; 271/245; 355/3 R
[58] Field of Search .................. 271/3.1, 3, 4, 5, 6, 271/7, 10, 245, 246; 355/3 R, 8, 11, 14, 99, 100, 101

[56] References Cited

U.S. PATENT DOCUMENTS

| | | | |
|---|---|---|---|
| 2,654,300 | 10/1953 | Baker | 355/100 |
| 3,556,512 | 1/1971 | Fackler | 271/4 |
| 3,630,607 | 12/1971 | Korn et al. | 355/14 |
| 3,747,918 | 7/1973 | Margulis et al. | 271/4 |
| 3,888,579 | 6/1975 | Rodek et al. | 355/14 |

FOREIGN PATENT DOCUMENTS

1128295  4/1962  Fed. Rep. of Germany ............. 271/4

Primary Examiner—Bruce H. Stoner, Jr.
Attorney, Agent, or Firm—G. Herman Childress

[57] ABSTRACT

A recirculating feeder for use with a document copier to produce collated copies of multi-page documents and the like. The feeder operates with the document pages or sheets stacked right-side-up in their normal sequential order. The sheets are removed one-at-a-time from the bottom of the stack, presented face-down for copying, and returned again right-side-up to the top of the stack. The right-side-up orientation and bottom feed permits visual inspection of the copying cycle for assurance that it is proceeding properly, facilitates collation of the final copies in the right-side-up orientation, and permits visual comparison of the document stack with the copy stack.

9 Claims, 5 Drawing Figures

FIG. 5

RECIRCULATING SHEET FEEDER

This application is a continuation of application Ser. No. 523,610, filed Nov. 13, 1974, now abandoned.

CROSS REFERENCE TO RELATED APPLICATIONS

Reference should be had to commonly assigned, co-pending U.S. Pat. application Ser. No. 481,436, entitled, SYNCHRONIZING CONTROL APPARATUS FOR ELECTROPHOTOGRAPHIC APPARATUS UTILIZING DIGITAL COMPUTER, filed June 20, 1974, in the names of W. E. Hunt et al., now U.S. Pat. No. 3,914,047, such application having been a continuation of commonly assigned, abandoned U.S. Pat. application Ser. No. 402,223, filed Oct. 1, 1973.

BACKGROUND OF THE INVENTION

Field of the Invention

The present invention relates generally to sheet feeding or delivering. More specifically, this invention relates to feeding apparatus of the kind wherein a plurality of sheets are fed from a supply area to an exposure area for copying, and returned after exposure to the supply area for either removal or another feeding cycle.

DESCRIPTION OF THE PRIOR ART

Where it is desired to make several copies of a multipage original, providing copies which have the same page order or sequence as the original, each page of the original may be copied the required number of times in its proper page order and the resulting page copies appropriately collated. To facilitate this manner of copying, the prior art, as for example U.S. Pat. No. 3,747,918, patented July 24, 1973, discloses a sheet feeder which feeds individual sheets in succession from the top of an originating stack to an exposure platen of a copying machine. At the exposure platen, a sheet is exposed the required number of times and then is expelled from the sheet feeder. The resulting copies of the sheet may be forwarded from the copier to a collating machine which, in turn, routes the sheet copies to respective collator bins. After each of the sheets have been fed from the stack and copied, each collator bin will contain a single complete copy of the stack, with the sheet copies arranged in the same order as the sheets originally in the stack.

Although the sheet feeder in U.S. Pat. No. 3,747,918 allows for collated copies of a multi-page original, it must be used with some kind of a collator, which increases both the complexity and expense of the copying operation. Alternatively, each page of the original may be copied once in the order or sequence in which it appears. There results a single copy of the original, having each page arranged in the same order of the original. This manner of copying can be repeated as many times as required to provide the desired number of copies of the original without employing a collator. However, such an approach is best served by providing some device for automatically handling the pages of the original to repeatedly present each page at the exposure platen in the proper sequence and at the proper time. This device has generally taken the form of a recirculating sheet feeder, which feeds individual sheets in succession from the bottom of an originating stack to the exposure platen and returns them singly to the top of the stack in their original orientation. After each of the sheets have been fed once, they can be either fed again or removed from the feeder. By this apparatus, which is disclosed for example in U.S. Pat. No. Re. 27,976, patented Apr. 23, 1974, several copies of a multi-page original can be delivered from the copier with their respective pages in the same order. Such a result is achieved because the sheet feeder maintains the proper page order of the original after completing each copy cycle. Of course, should the copy pages be delivered from the copier in the same order as the original page, collation of the copy pages is unnecessary.

To facilitate the discussion which follows regarding known recirculating feeders, it will be convenient to refer to these feeders as (i) a reversing or bidirectional kind, and (ii) a non-reversing or unidirectional kind.

The reversing kind of a recirculating feeder is disclosed for example in U.S. Pat. No. 3,556,512, patented Jan. 19, 1971. According to this reference, individual sheets are fed in succession from the bottom of an originating stack to a waiting area proximate an exposure platen of a copier. A sheet transport, in the form of an endless feed belt overlying the exposure platen, is driven forwardly to draw a sheet onto the platen. To position the sheet in registration with the platen for exposure, the belt is reversed, i.e. driven backwardly, feeding the sheet backwardly into abutment against a retractable registration stop member. Then, the sheet is exposed in place on the platen. The feed belt may be stopped during exposure or it may continue to move backwardly, slipping on the sheet (at that time prevented from backward movement by the registration member). After exposure, the registration member is retracted and the feed belt, moving backwardly, expels the sheet from the platen. Then, the sheet is returned to the top of the originating stack. After one sheet has been expelled from the platen by moving the belt backwardly, the belt is again reversed, moving forwardly to draw another sheet onto the platen. It will be realized that each time the feed belt is reversed, it must be brought to a halt and started again. This stopping and restarting of the feed belt gives rise to several typical mechanical problems, for example, involving the backlash and inertia of the belt and the belt driving members. Moreover, by this stopping and restarting of the feed belt, there is a delay in sheet movement, and consequently a delay in the copy cycle. Such a delay may be further increased because, in the reversing recirculating feeder, it appears that one sheet must be expelled completely from the exposure platen before another sheet can be initially drawn thereon.

Another recirculating feeder, the non-reversing kind, is disclosed for example in U.S. Pat. No. 3,552,739, patented Jan. 5, 1971, and in Ger. Pat. No. 1,128,295, patented Apr. 19, 1962. This recirculating feeder, as disclosed, appears to obviate some of the disadvantages of the reversing recirculating feeder mentioned above; because here, the sheets, during recirculating movement between the originating stack and the exposure platen, are fed in a single or forward direction (rather than in forward and reverse directions). This is accomplished by feeding the sheets along a feed path which is substantially in the form of a closed loop. With sheet feeding in a single direction, it will be realized that there is not required any reverse movement of a feed belt or other sheet transport. However, it is to be noted that in each of the U.S. and Ger. patents certain ones of the transport members are repeatedly stopped and restarted. For example, in the Ger. patent, an image-bearing sheet and a photosensitive sheet are fed separately from originating stacks into abutment against a retractable stop member. The stop member serves to align the sheets at their forward, leading edges. Then apparently, a pair of initially stationary rollers are rotated and pivoted toward each other into contact with the sheets, and at the same time the stop member is retracted, allowing the rollers to feed the sheets to an exposure platen. Thereafter, the rollers are pivoted away from each other and their rotation discontinued. On the other hand, in the U.S. patent, two separate endless feed belts, which serve to feed the sheets respectively from and back to an originating stack, are inactivated during the time that another endless feed belt slides a sheet across an exposure platen for scanning exposure. The repeated stopping and restarting of a sheet transport in both the U.S. and German patents may give rise to several mechanical problems, examples of which are mentioned above. Moreover, there may be caused a delay in the copy cycle because a stopped transport, before again feeding a sheet, must overcome its inertia and resume a feeding speed similar to that of other activated or running transport means so as to reduce the possibility of sheet tearing.

While U.S. Pat. No. 3,552,739 and German Pat. No. 1,128,295 are considered as each disclosing an example of a recirculating feeder for the purpose of this description of the prior art, it is to be noted that, in these patents, the copies are delivered from the copier with their respective pages in a different order than the page order of the original. Consequently, collation of the copy pages is necessary.

A further disadvantage of the non-reversing recirculating feeder in German Pat. No. 1,128,295 is that the copying apparatus, including the exposure platen, is located inside (rather than outside) of the loop-like path of sheet movement. This would seem to prevent use of that recirculating feeder with many new copiers, such as the kind in U.S. Pat. No. 3,552,739, which is an automatic xerographic reproducing machine. Moreover, by enlarging the loop-like path to encircle the copying apparatus, the travel time of a sheet between the originating stack and the exposure platen is increased. One further disadvantage, in the German Patent, is that the exposure platen is located well within the copying apparatus, raising the possibility of "loosing" a sheet during movement to and from the exposure platen because of a sheet jam, for example.

Beside causing some delay in the copy cycle by repeatedly stopping and restarting a sheet transport, known reversing and non-reversing recirculating feeders typically require that a multi-page original be loaded into each feeder, and removed from the feeder, in an upside down or reverse orientation. It will be realized that in this orientation the sheets are handled by an operator with their respective sides selected for copying facing downwardly in a stack. Therefore, it is difficult for the operator to view the selected side of each sheet without inverting the stack. For this reason, handling a multi-page original in an upside down orientation is inconvenient and less desirable than handling the same original in a natural or rightside up orientation. Moreover, by stacking the sheets in a feeder with their respective sides selected for copying facing downwardly, the operator may not be able to determine, by looking at the stack during the copy cycle, which of the sheets have been copied and returned to the stack and which of the sheets remain to be copied. This is exemplified by the recirculating feeders in U.S. Pat. Nos. 3,552,739; 3,556,512; Re. 27,976; and in German Pat. No. 1,128,295. There, during the copy cycle, the sheets are stacked with their respective sides selected for copying facing downwardly. As a result, should the opposite sides of these sheets be blank, the operator, by looking at the stack, cannot determine whether or not the topmost sheet has already been copied. On the other hand, in these patents, were the operator to stack the sheets selected side upwardly, copying would not be possible because each sheet would be deposited on the exposure platen with its selected side facing away from the platen during exposure.

SUMMARY OF THE INVENTION

As distinguished from known recirculating feeders, the recirculating feeder of the present invention receives a multi-page original in a natural or rightside up orientation and enables removal of the multi-page original, after copying, intact in the natural orientation. Another distinction is that the inverted feeder avoids causing a delay in the copy cycle, by maintaining its sheet feeding means continuously (rather than intermittently) in motion during recirculating movement of the sheets between an originating stack and an exposure platen. And owing to its uniquely designed sheet feed path, the inverted feeder is capable of a relatively high recirculating speed.

With the recirculating feeder of the instant invention, according to a preferred embodiment thereof, the stacked sheets are in their original order and orientation after copying. Moreover, the sheets are loaded into the feeder, and removed from the feeder after copying, with their respective sides selected for copying facing upwardly in the stack. As a result, a multi-page original can be handled by an operator as it normally appears, i.e. in a rightside up orientation, with the first page in view. This is due, in essence, to the manner of sheet feeding. Specifically, a sheet feed path is defined by which sheets stacked selected side upwardly in a supply tray are removed from the stack bottom, deposited selected side downwardly on an exposure platen and returned selected side upwardly to the stack top, in the proper sequence. Because the sheets are returned in the proper order selected side upwardly to the stack top, the operator, by looking at the topmost sheet in the originating stack during the copy cycle, can determine which of the sheets have been exposed and which remain to be exposed.

According to the preferred embodiment, the sheet feed path is substantially in the form of a single closed loop, with the exposure platen located outside this loop. Such an arrangement enables the recirculating feeder of the instant invention to be used with many of the recently devised copiers; an example of which is disclosed in U.S. Pat. application Ser. No. 481,436, more fully referenced herein before. Further in accord with the preferred embodiment, the supply tray is located directly above (though spaced from) the exposure platen. By this feature, a particularly compact and efficient loop shape is realized, enabling a relatively high recirculating speed.

During a typical feeding operation, the sheets are fed seriatim in a single direction along the feed path, exiting selected side upwardly from the supply tray at the stack bottom, depositing selected side downwardly on the exposure platen, and returning selected side upwardly to the supply tray at the stack top. Each of the sheet feeding means, for this purpose, is maintained continuously in feeding motion during sheet movement along the feed path. Consequently, there is no delay in the copy cycle, as caused by repeatedly stopping and restarting any of the sheet feeding means. Where it is desired to hold the sheet stationary during exposure on the platen, a retractable registration member is provided for momentarily blocking sheet movement at a platen end farthest removed along the feed path from the supply tray. Moreover, sheet propelling means, such as several feed rollers, are located within the loop adjacent to the platen for feeding sheets selected side downwardly past the platen. These rollers are continuously rotated in contact with a sheet lying on the platen; however, they slip on the sheet during blockage by the registration member. By continuously rotating the rollers in contact with the sheet during registration and exposure, the high speed capability of the recirculating feeder is further enhanced. After each of the sheets in the originating stack have been fed once, they can be either fed again or removed from the feeder. Accordingly, several copies of the multi-page original can be delivered from the copier with their respective pages in the same order and orientation as the original, and consequently do not have to be collated. This result is achieved because the recirculating feeder of the instant invention preserves the proper order and orientation of the original after each copy cycle.

BRIEF DESCRIPTION OF THE DRAWINGS

For a more complete understanding of the instant invention, as well as the advantages and features thereof, reference should be had to the following detailed description of the invention taken in conjunction with the accompanying drawings, in which.

DESCRIPTION OF THE PREFERRED EMBODIMENT

It may be well before proceeding with a detailed description of the preferred embodiment to first consider an electrophotographic copier with which such an embodiment may be used. Although the preferred embodiment is particularly well suited for use in an electrophotographic copier, it could be used with equal facility and advantage in any number of other copying, duplicating or reproducing machines. All that is desired is that such a machine have a platen or equivalent support on which successive sections of sheet material can be placed for copying. This sheet material may be in cut, fan-folded or endless loop form, for example.

Electrophotographic Copier

Figure 1:
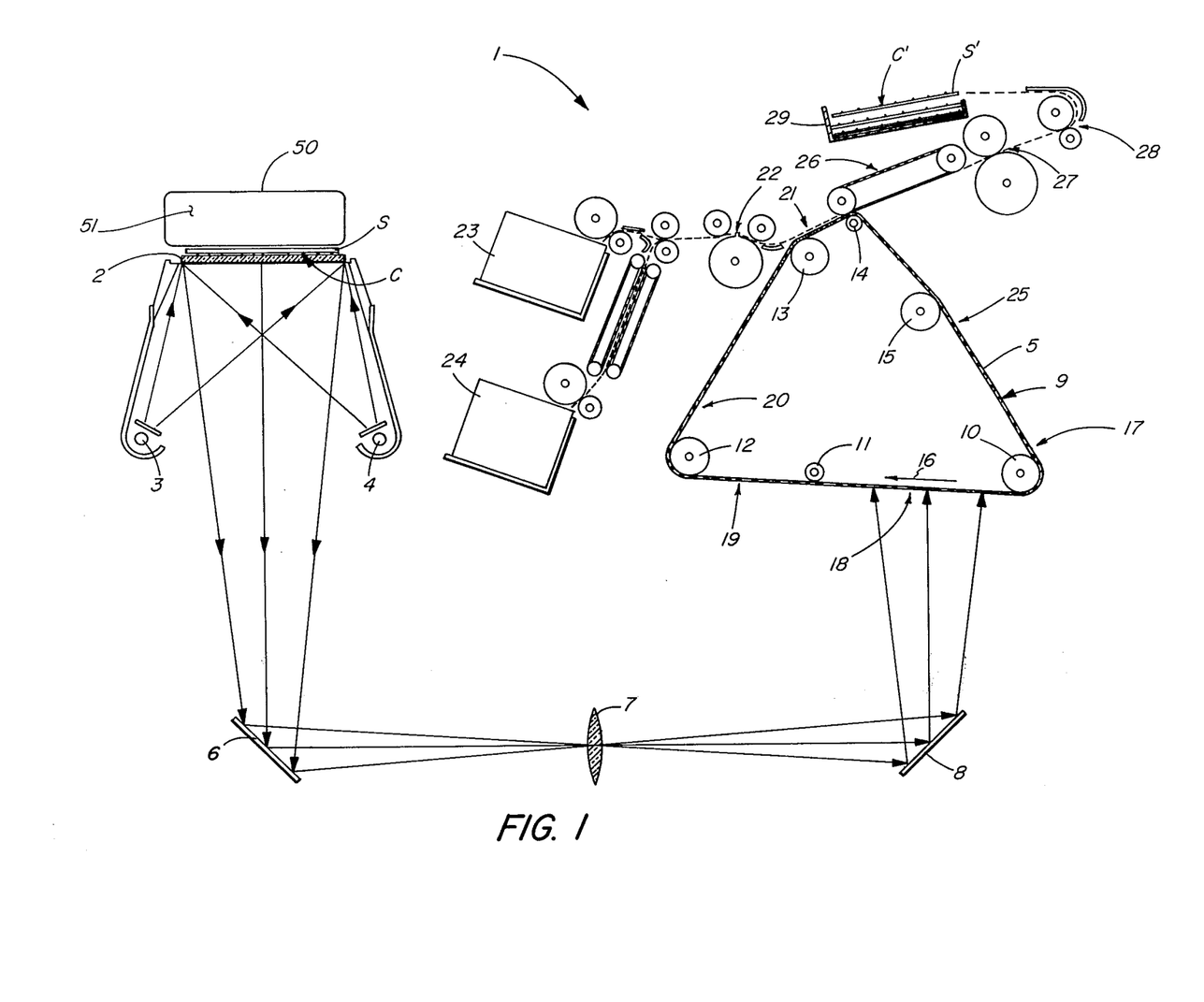
FIG. 1 is a schematic front elevation view of an electrophotographic copier, equipped with a recirculating feeder according to a preferred embodiment of the present invention.

Referring now to the drawings and in particular to FIG. 1, there is schematically illustrated an electrophotographic copier, designated generally by the reference numeral 1. Only those features of the copier which are helpful for a full understanding of the preferred embodiment are described hereinafter. However, a more complete description of the copier may be found in previously referenced U.S. Pat. application Ser. No. 481,436.

To copy a selected side C of an original sheet S, using the copier 1, the original sheet is placed with the selected side facing downwardly on an exposure platen 2 constructed of transparent glass. When energized, two xenon flash lamps 3 and 4 illuminate the selected side C of the original sheet S; whereupon, a light image of the selected side is reflected back from the exposure platen 2, and projected as an inverse or mirror image onto a discrete section of a photoconductive web 5 by means of an object mirror 6, a lens 7 and an image mirror 8. The photoconductive web 5 has a photoconductive or image receiving surface 9, with a transparent support backing, and is trained as an endless or continuous belt about six transport rollers, 10, 11, 12, 13, 14 and 15. At least one of these rollers is driven to move the web 5 substantially in a clockwise direction, indicated generally by an arrow 16. This movement will cause successive sections of the web 5 to sequentially pass a series of electrophotographic work stations. For the purposes of the instant disclosure, the several work stations along the path of movement of the web may be described functionally as follows:

a charging station 17, at which the photoconductive surface 9 of the web 5 is sensitized by receiving a uniform electrostatic charge;

an exposing station 18, at which the inverse image of the selected side C of the original sheet S is projected onto the photoconductive surface 9 of the web 5, dissipating the electrostatic charge at the exposed areas of the photoconductive surface and forming a latent electrostatic image thereon which corresponds inversely to the indicia on the selected side of the original sheet;

a developing station 19, at which developing powder, including toner particles having an electrostatic charge opposite to that of the latent electrostatic image, is brushed over the photoconductive surface 9 of the web 5, causing the toner particles to adhere to the latent electrostatic image and visibly form a toner particle or developed image which is a mirror resemblance of the indicia on the selected side C of the original sheet S;

a postdevelopment erase station 20, at which the web 5 is illuminated to reduce photoconductor fatigue, i.e. its inability to accept or hold an electrostatic charge;

a transfer station 21, at which the developed image is electrostatically transferred from the photoconductive surface 9 of the web 5 to a receiving side C' of a copy sheet S' (movement of the copy sheet being checked by a registration device 22 to assure its arrival at the transfer station, from either one of two supply bins 23 and 24, coincidently with the arrival of the developed image at the transfer station);

a cleaning station 25, at which the photoconductive surface 9 of the web 5 is cleaned of any residual toner particles remaining thereon after developed image transfer and is substantially completely discharged of any residual electrostatic charge remaining thereon.

The developed image, as transferred onto the copy sheet S', has the same indicia configuration as that on the original sheet S. After receiving the developed image at the transfer station 21, the copy sheet S', separates from the web 5 at the roller 14, and is carried by a vacuum transport 26 to a fusing station 27. The fusing station 27 serves to fix the developed image by fusing the toner particles to the receiving side C' of the copy sheet S'. Then, the copy sheet S' is moved through a guide and feed roller arrangement 28, coming to rest in a completed copy tray 29. As depicted in FIG. 1, the copy sheet S' is deposited in the copy tray 29, fixed image or receiving side C' facing upwardly, and on top of an earlier similarly deposited copy sheet.

To coordinate operation of the various work stations 17, 18, 19, 21 and 25 with movement of the image areas on the web 5 successively past these stations, the web has a plurality of perforations, not shown, along one of its edges and there is provided, at a fixed location along the path of web movement, suitable means for sensing the web perforations. This sensing generates input signals which are fed into a digital computer, not shown. The digital computer has a stored program, responsive to the input signals, for sequentially actuating and deactuating the work stations in properly timed relation with movement of the web's image areas to and from these stations.

Recirculating Feeder

The preferred embodiment of a recirculating feeder, according to the present invention, is designated generally by the reference numeral 50 in FIG. 1. With this feeder 50, a plurality of sheets can be repeatedly fed in succession from an originating stack to the exposure platen 2 of the electrophotographic copier 1. This is done by returning the sheets to the originating stack in the same order or sequence as they are fed therefrom. To operate the feeder 50 in coordinated association or synchronism with the copier 1, the feeder includes suitable means, as is known in the art, for providing "go" and "no go" signals to the ditigal computer in the copier. These signals are indicative of the various "ready" and "not ready" conditions occurring with respect to sheet feeding in the feeder, and enable the digital computer to properly sequence each of the related work activities in the feeder and the copier. Examples of these sensing means in the feeder 50 appear in the description which follows.

Figure 2:
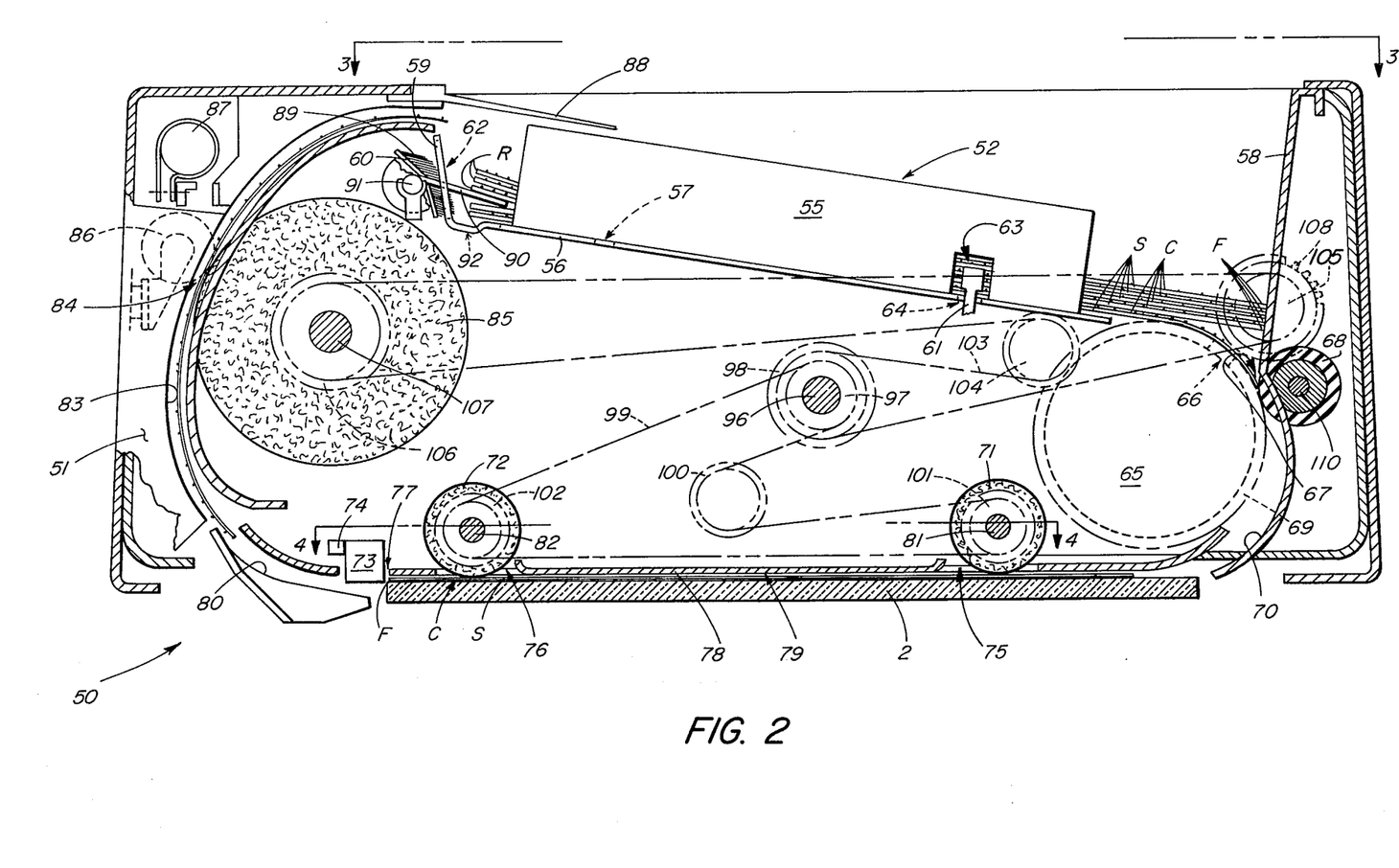
FIG. 2 is an enlarged front elevation view, partly in section, of the recirculating feeder.
Figure 3:
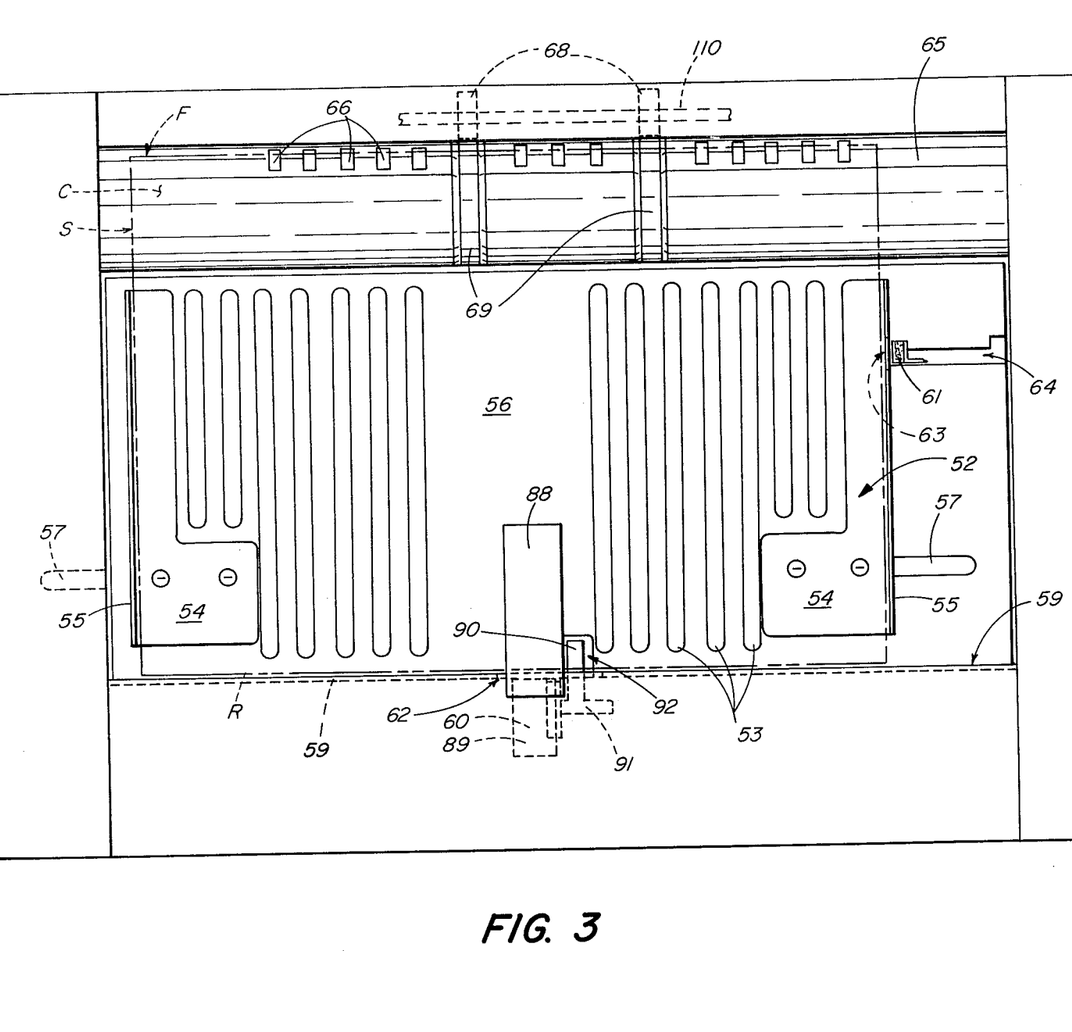
FIG. 3 is a top plan view of the recirculating feeder as viewed along the line 3—3 in FIG. 2.

FIG. 1 shows a front view of the recirculating feeder 50, which is positioned directly on top of the exposure platen 2. For access to the exposure platen 2, the recirculating feeder 50 is raised, at a front end 51 thereof, causing the entire feeder to pivot about a rearwardly located connection, not shown, with the copier 1. Particular details of the recirculating feeder 50 are shown in FIGS. 2-5. As illustrated in FIG. 2, the recirculating feeder 50 is loaded by placing an originating stack of sheets S into a supply tray 52. The sheets S, stacked in the tray 52, are oriented with their respective sides C selected for copying facing upwardly. Referring to FIG. 3, the bottom-most sheet in the stack, which is the first to be removed from the stack, is supported on several ribs 53 and the flat base portions 54 of two, otherwise upstanding, sheet edge guides 55. The ribs 53 and the base portions 54 of the edge guides 55 each project, to the same height, from the floor plate 56 of the tray 52. Consequently, for the most part, an air space is provided between the bottom-most sheet in the stack and the floor plate which facilitates removal of the bottom-most sheet from the stack bottom. The edge guides 55 are mounted in respective slots 57 in the floor plate 56 for movement toward and away from each other to accommodate different width sheet sets. The ribs 53 are arranged so as not to interfere with this movement of the edge guides 55. As viewed in FIG. 2, the tray 52 is inclined downwardly to the right, causing the forward or leading edges F of the sheets S to rest in abutment against a forward wall plate 58. The rearward or trailing edges R of the sheets S are spaced from a rearward wall plate 59 of the tray 52. During the feeding cycle, in which the sheets S are removed from the stack bottom and returned to the stack top, an end jogger 60 and a side jogger 61 separately move back and forth to maintain the sheets aligned or squared with each other in the stack. As shown in FIG. 3, two openings 62 and 63 are provided respectively in the rear wall plate 59 of the tray 52 and in one of the edge guides 55 for passage of the end and side joggers 60 and 61. The end jogger 60 is movably adjustable to accommodate different length sheet sets. The side jogger 61 is mounted in a slot 64 in the floor plate 56 to enable its coordinated movement with the edge guides 55 during their adjustment for sheet width.

A rotatably supported vacuum cylinder 65, as shown in FIG. 2, extends partially into the space between the floor plate 56 and the wall plate 58. The vacuum cylinder 65, which is hollow, is sealed except for a single elongate series of air intake ports 66, shown in FIG. 3, and an air out-take opening, not shown. Suitable conduit and gasket means, not shown, connect the air out-take opening with a vacuum source, in the copier 1, for drawing air from the cylinder interior. Initially, the vacuum cylinder 65 is orientated with the air intake ports 66 in a starting position located beneath the forward edge F of the bottom-most sheet S in the tray 52. Air rushing into the intake ports 66 causes this forward edge F to peel away from the stack bottom and adhere to the vacuum cylinder 65. Then, the vacuum cylinder 65 is rotated slightly in a clockwise direction, as viewed in FIG. 2, drawing the bottom-most sheet S from the stack only enough to deliver its forward edge F into respective feeding nips 67 defined by continuously rotating feed rollers 68 and backup rings 69. The remaining sheets S are prevented from separating from the stack by the abutment of their forward edges F with the wall plate 58. The backup rings 69, shown in FIGS. 2 and 3, extend around the vacuum cylinder 65, rotating with respect to the vacuum cylinder and about the same axis.

As depicted in FIG. 2, the backup rings 69, cooperate with the feed rollers 68 to effect complete removal of the bottom-most sheet from the stack and to feed the removed sheet along an arcuate guide 70 to the exposure platen 2. As soon as the vacuum cylinder 65 has delivered the forward edge of the bottom-most sheet into the feeding nips 67, it is reversed, rotating slightly in a counterclockwise direction, as viewed in FIG. 2, until the intake ports 66 are returned to their starting position. During this reverse movement of the vacuum cylinder 65, the intake ports 66 inch rearwardly along the bottom-most sheet as it is being drawn between the feed rollers 68 and the backup rings 69. After the intake ports 66 have returned to their starting position, the rearward edge of this sheet clears them; whereupon, there is a renewed rush of air into the intake ports which peels the forward edge of the next appearing bottom-most sheet from the stack bottom and adheres it to the vacuum cylinder 65. Then, the vacuum cylinder 65 is again rotated slightly in a clockwise direction, drawing the next appearing bottom-most sheet from the stack only enough to deliver its forward edge into the feeding nips 67. The feeding nips 67 receive the forward edge of this sheet upon departure of the rearward edge of the previous sheet from the feeding nips. Accordingly, by the sequence just described, each of the sheets S are removed one at a time in succession from the stack bottom and fed to the exposure platen 2.

Figure 4:
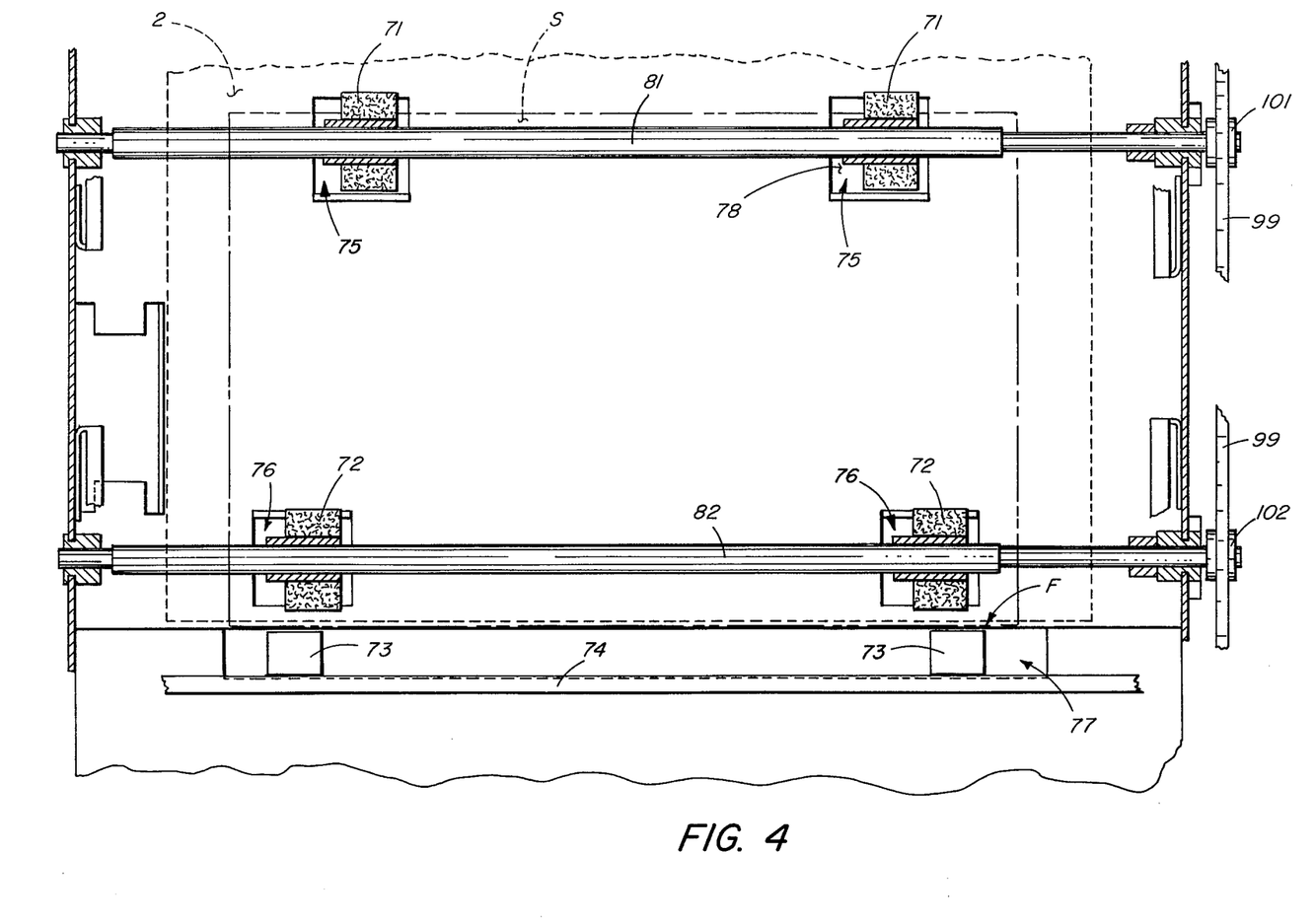
FIG. 4 is a top plan view of the recirculating feeder as viewed along the line 4—4 in FIG. 2.

As depicted in FIG. 2, each sheet S exiting from the arcuate guide 70 is deposited onto the platen 2, in an exposure position, with its side C selected for copying facing downwardly. Two sets of continuously rotating feed rollers 71 and 72, as shown in FIG. 4, move the sheet S, selected side C downwardly, along the platen 2 and into registation therewith for exposure. During such registration, the sheet S lies stationary on the exposure platen 2 with its forward edge F in abutment against two registration pads 73, which are spaced apart from each other on a registration bar 74. As shown in FIG. 2, the registration pads and bar 73 and 74 are located at the platen end farthest removed along the feed path from the supply tray 52. Because the feed rollers 71 and 72 urge the sheet S against both of the registration pads 73, any skew in the sheet is corrected before it is exposed. Feed rollers 71 and 72 and the registration pads 73 depend through respective openings 75, 76 and 77 in a backup plate 78. This plate 78 extends substantially parallel to the platen 2. On the side 79 of the plate 78, which faces the platen 2, there is coated a light reflective material serving as a light shield during exposure. While the registration pads 73 block movement of the sheet S, feed rollers 71 and 72 continue to rotate, slipping on the backside of the sheet. This slipping occurs for some fraction of a second (during the time the sheet is stationary) between registration of the sheet and its exposure. After exposure, suitable means such as a solenoid, not shown, is actuated to retract the registration bar 74, with the registration pads 73, away from the feed path and out of the way of the sheet S. Then, as depicted in FIG. 2, the sheet S is immediately expelled by the rotating rollers 71 and 72 from the exposure platen 2 and onto an arcuate guide 80. To again locate the registration bar 74, with the registration pads 73, as shown in FIG. 2 for sheet registration, suitable means are provided, though not snown, to deactuate the retracting means in response to expulsion of one sheet from the exposure platen and movement of another sheet thereon.

Because the feed rollers 71 and 72 continue to rotate during registration and exposure, there are none of the previously described problems involving inertia, backlash or delay in sheet movement which might otherwise occur should these feed rollers stop rotating before exposure and resume rotating in the same or opposite direction after exposure. It will be realized that this feature of continuously rotating the feed rollers 71 and 72 in contact with the sheet S during registration and exposure contributes to the high speed capability of the recirculating feeder 50.

As shown in FIG. 4, shafts 81 and 82 of the feed rollers 71 and 72 are not displaceable from the respective rollers axes of rotation (except for an occasional adjustment of roller pressure, as is well known); and, therefore, are not movable to relieve roller pressure on the sheet S during the time that it lies on the exposure platen 2. However, the feed rollers 71 and 72 are constructed of polyurethene foam and, optionally, have a silicone rubber coating on the roller periphery. The silicone rubber coating increases the page propelling ability of each feed roller, and the polyurethene foam allows successive radial sectors of each feed roller to slightly compress during contact with the sheet so as to relieve roller pressure thereon. Such a construction enables the feed rollers 71 and 72 to move the sheet S, when called for, and to slip on the sheet's backside during registration and exposure, without causing any arching or other deforming of the sheet.

As depicted in FIG. 2, each sheet S expelled from the platen 2 after exposure is moved by the feed rollers 72 from the arcuate guide 80 to the arcuate guide 83. Approximately half-way along the arcuate guide 83, the sheet S (still being moved by the feed rollers 72) enters a feeding nip 84 defined by continuously rotating feed rollers 85 and idler or pressure rollers 86. These rollers 85 and 86 cooperate to feed the sheet S past an electrostatic discharge device 87, which neutralizes any static electrical charge on the sheet before its return by the rollers to the originating stack in the supply tray 52. When the sheet S exits from the arcuate guide 83, a finger member 88 deflects it downwardly to the right, as viewed in FIG. 2, depositing the sheet on the stack top with its side C selected for copying facing upwardly. The end and side joggers 60 and 61, which at this time are moving back and forth, align or square each returning sheet with others in the stack. Looking at FIG. 2, the end jogger 60 is faced with a plush material 89 arranged with its fibers extending downwardly to the right. When a sheet S is returned to the tray 52, it enters from left to right, and then rebounds from right to left off the forward wall plate 58. The plush fibers 89 momentarily engage the rebounding sheet, which is then released to fall onto the stack top. This arrangement reduces the time required for the rebounding sheet to become stabilized or squarely oriented in the stack, and assists in preventing that sheet from rebounding into another next arriving sheet.

Again referring to FIG. 2, there is shown a separator member 90 which extends, through the opening 62 in the rearward wall plate 59, into the originating stack in the supply tray 52. The separator member 90, as viewed in FIG. 2, separates the sheets S in the stack which have been exposed and those which remain to be exposed, at their rearward edges R. More specifically, the rearward edges of the sheets already exposed lie above the separator member and the rearward edges of the sheets awaiting exposure lie below the separator member. The separator member 90 is fixed to a rotatably supported shaft 91. Consequently, during the feeding cycle, as the sheets S are fed in succession from the stack bottom to the exposure platen 2 and returned singly to the stack top, the separator member 90 rotates incrementally in a clockwise direction, as viewed in FIG. 2, at the shaft 91. When the last one of the sheets to be exposed is fed from the stack bottom, the separator member 90 drops through an opening 92 in the floor plate 56 of the supply tray 52. Where two or more feeding cycles are required, as where several collated copies of a multi-page document are desired, the separator member 90 is moved by suitable drive means, not shown, onto the topmost sheet in the stack. This is done, of course, after the last one of the sheets to be exposed a first time is returned to the stack top. When the separator member 90 drops through the opening 92 in the floor plate 56, a counter switch, not shown, is actuated. This switch actuation is sensed by the digital computer in the copier 1, indicating to the computer that a single sheet set has been copied. At the end of the copy job, the computer recognizes concurrence between the number of sensed switch actuations and the number of sheet set copies requested by an operator; whereupon, the recirculating feeder 50 may be deactivated after the last one of the sheets to be finally exposed is returned to the stack top.

With the recirculating feeder 50 according to the preferred embodiment, it should be recognized that the sheets S are loaded into the supply tray 52 before copying, and removed from the supply tray after copying, with their respective sides C selected for copying facing upwardly in the originating stack. Accordingly, a multipage document can be handled by an operator as it normally appears, i.e. in a rightside up orientation, with the first page in view. This is due, in essence, to the disclosed manner of sheet feeding. Specifically, during the feeding cycle, the sheets S are fed seriatim in a single or forward direction along the feed path, exiting selected side C upwardly from the supply tray 52 at the stack bottom, depositing selected downwardly on the exposure platen 2, and returning selected side upwardly to the supply tray at the stack top. Because the sheets S are returned in the proper order selected side C upwardly to the stack top, the operator, by looking at the topmost sheet in the originating stack during the feeding cycle, can determine which of the sheets have been exposed and which remain to be exposed.

Another advantage is that the recirculating feeder 50 prescribes the proper page order and orientation of the multipage document after each complete copy cycle. Therefore, the operator can remove the multi-page document from the supply tray 52 after the copy cycle, with the pages in their originating order and orientation. Then, the multi-page document can be stapled and returned to file for future use as required.

As will be realized by looking at FIG. 2 and from the description above, the feed path is substantially in the form of a single closed loop, with the exposure platen 2 located exteriorly thereadjacent. The supply tray 52 is located directly above (though spaced from) the exposure platen 2. By this arrangement, a particularly compact and efficient loop shape is realized which contributes to the high speed capability of the recirculating feeder 50. Moreover, the recirculating feeder can be used with many of the recently devised copiers, such as disclosed in U.S. patent application Ser. No. 481,436, more fully referenced hereinbefore.

Figure 5:
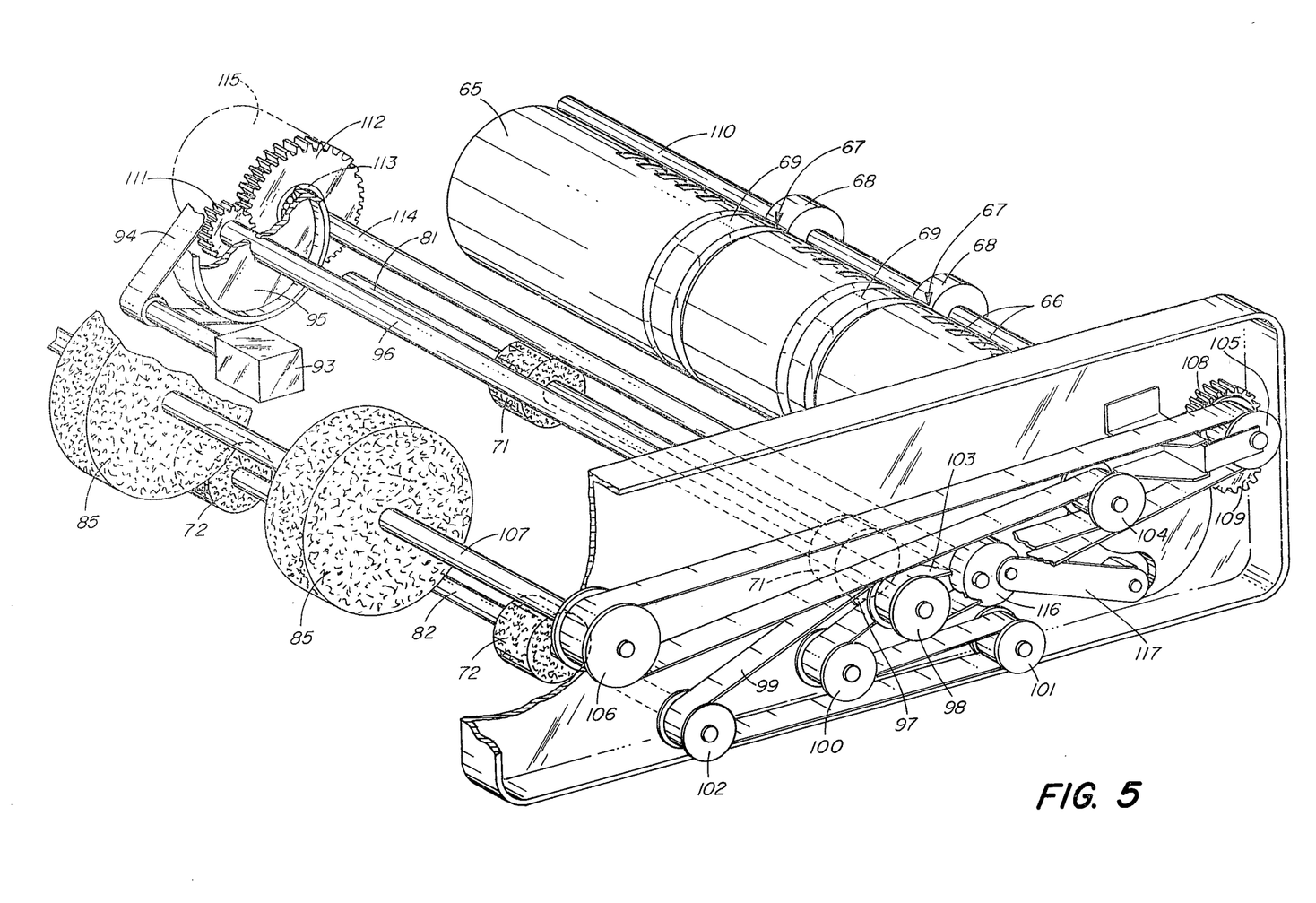
FIG. 5 is a perspective view of a drive mechanism in the recirculating feeder.

FIGS. 2 and 5 show the drive mechanism for continuously rotating feed rollers 68, 71, 72 and 85 during sheet movement along the feed path. Looking at FIG. 5, a drive motor 93 serves to move an endless drive belt 94; rotating a fly wheel 95, a drive shaft 96 and two side-by-side drive pulleys 97 and 98. Rotation of the drive pulley 97 moves an endless drive belt 99; rotating a belt tensioning pulley 100 and two roller pulleys 101 and 102. By rotating the roller pulleys 101 and 102, the roller shafts 81 and 82 are rotated with the feed rollers 71 and 72. On the other hand, rotation of the drive pulley 98 moves an endless drive belt 103, rotating a belt tensioning pulley 104 and two roller pulleys 105 and 106. By rotating the roller pulley 106, a roller shaft 107 is rotated with the feed rollers 85. Rotation of the roller pulley 105 rotates two engaging gear wheels 108 and 109. By rotating the gear wheel 109, a roller shaft 110 is rotated with the feed rollers 68.

Again looking at FIG. 5, there is shown the drive mechanism for intermittently oscillating the vacuum cylinder 65 to deliver the forward edges of the sheets one at a time from the originating stack to the feeding nips 67 (of the feed rollers 68 and the backup rings 69) as soon as the rearward edge of a previous sheet departs therefrom. Rotation of the drive shaft 96 rotates two engaging gear wheels 111 and 112. Roller bearings 113 support the gear wheel 112 for rotation with respect to the drive shaft 114. While the gear wheel 112 is rotating, and a feed command from the logic and control means of the copier 1 is received by a one revolution clutch 115, the gear wheel rotates the clutch one revolution; rotating the drive shaft 114 to the same extent. By means of an eccentric 116, one revolution of the drive shaft 114 reciprocates a rod 117 a single time. This causes the vacuum cylinder 65 to rotate back and forth once in the manner described hereinbefore.

The present invention has been described in detail with particular reference to a preferred embodiment thereof; however, it should be understood that variations and modifications can be effected within the spirit and scope of the instant invention.

I claim:

1. A recirculating document feeder for use with copying apparatus and adapted to present at a position for copying original sheets from a stack of such sheets, the respective sheets having a selected side which is to be copied, and the apparatus having a platen at the copying position, said feeder comprising:

means for supporting the stack with the selected side of each sheet facing up and with the selected side of the topmost sheet unobstructed for viewing;

means defining a feed path extending first away from and then back to said supporting means, for directing sheets from the bottom of a stack at said supporting means into engagement with the platen and then to the top of the stack, said feed path defining with said supporting means a single closed-loop that inverts the sheet and directs the sheet into engagement with the platen selected side down and then inverts the sheet again and directs the sheet to the top of the stack selected side up;

means for holding a sheet stationary momentarily in engagement with the platen to enable copying of the sheet; and means operatively associated with said supporting means and said path defining means for feeding the respective sheets seriatim along said feed path in a single direction, said feeding means including propelling elements continously driven for engaging the sheets on the platen, and, after copying, for removing the sheets from the platen, said propelling elements slipping on the sheets while the sheets are stationary.

2. A recirculating document feeder adapted to circulate individual document sheets from a stack of such sheets through an exposure station of copying apparatus where the respective sheets are exposed to make copies and back to the stack, the copying apparatus delivering copy sheets image-side-up and with each copy sheet being on top of any previously delivered copy sheets, said feeder comprising:

means for receiving and supporting a stack of document sheets image-side-up, in sequence, with the last sheet of the document on the bottom of the stack and with the stack spaced from the exposure station;

means for circulating the document sheets comprising means (1) for removing the bottom-most sheet from the stack and for presenting the removed sheet to the exposure station image-side-down for copying, and (2) for returning the copied sheet to the top of the stack with the image-side-up; and means for controlling said circulating means so that the document sheets are sequentially circulated to the exposure station one or more times to produce one or more collated copies of the document sheets.

3. A feeder as set forth in claim 2 wherein the circulating means comprises means defining a closed loop path from the receiving means to the exposure station and back to the receiving means, means located along said path for movement into and out of a position for stopping a document sheet at the exposure station, and at least one continuously rotating feed roller located with respect to the path for continuously driving a document sheet at the exposure station toward said stopping means.

4. A recirculating document feeder adapted to circulate each document sheet from a stack of such sheets to a position for copying by copying apparatus, the copying apparatus including means for exposing, one at a time, document sheets located at the copying position to effect the production of one copy each time a document sheet is exposed, and the copying apparatus having means for collecting the copies in a copy stack with the copy images facing up, said feeder comprising:

means for supporting the stack of sheets;
means defining a feed path extending first away from and then back to said supporting means for guiding sheets sequentially from the bottom of the stack to the copying position for exposure one at a time and then back to the top of the stack, said feed path defining a single closed loop which turns a sheet over twice as it travels along the path between the bottom of the stack and the top of the stack;
means for locating said feeder on the copying apparatus with the exposure means of the apparatus outside of the closed-loop defined by said feed path; and
control means for sequentially recirculating the document sheets along the feed path for exposing each of such sheets once each time it is at the copying position, thereby to effect production of collated copies of the document.

5. Copier apparatus adapted to feed document sheets, each having a selected side, to an exposure position, and to make copies of the selected sides, the apparatus comprising:

means for supporting a stack of document sheets with the selected side of each sheet facing upwardly before and after exposure;
means defining a feed path for guiding sheets from the bottom of the stack at said supporting means into the exposure position with the selected side facing downwardly and then onto the top of the stack with the selected side facing upwardly, said feed path being substantially in the form of a single loop and including a lower section which defines the exposure position and is located below said supporting means;
means operatively associated with said supporting means for separating sheets one at a time from the bottom of the stack;
means for holding a sheet stationary in said lower section to register such sheet in the exposure position, said holding means being movable to a position to allow a sheet to leave said lower section after exposure of the sheet;
means operatively associated with said defining means and in driving contact with a sheet which is separated from such stack for feeding such sheet in a single direction along said feed path from said separating means and onto the top of such stack in a recirculating manner, said feeding means including propelling means located within said single loop for driving contact with a sheet in said lower section, although slipping on such sheet during the time it is held stationary by said holding means;
drive means for maintaining said feeding means continuously in motion while said sheets are in said feed path;
means remote from the path defining means for forming on a copy sheet an image of the selected side of the document sheet;
means for receiving a stack of copy sheets; and
means for delivering copy sheets sequentially into a stack in said receiving means with the copy sheets corresponding to the document sheets both in sequence order and in the relative positions of an image on one copy sheet with respect to an image on any other copy sheets.

6. A copier for making one or more copies of each page of a multi-page document, the copier comprising:
an exposure platen against which a selected side of each document page can be placed for copying;
a photoconductive member remote from the exposure platen;
means for projecting an image of a document page at the platen onto the photoconductive member;
means for receiving and collecting the copies facing up in a copy stack with the first copy made being at the bottom of the stack;
means for receiving the document pages in a stack and for supporting the stack spaced from the exposure platen with the selected side of each document page facing up; and
means (1) for successively presenting each document page of the stack to the exposure platen beginning with the bottom-most page and with the selected side engaging the platen for copying, and (2) for returning each document page successively to the top of the stack with the selected side facing up;
whereby collated copies of a multi-page document can be obtained by positioning the document pages in a stack in the receiving means with the first page of the document on top of the stack and other pages in serial order therebelow.

7. A copier as set forth in claim 6 wherein said presenting and returning means comprises means defining a substantially closed-loop path for document pages from the receiving means to the platen and back to the receiving means.

8. A copying machine comprising:
an exposure platen on which a selected side of a document sheet can be positioned to make a copy of the selected side;
a receiving tray spaced from said exposure platen for supporting a stack of document sheets with the selected side of each sheet facing upwardly;
means defining a substantially closed feed path for guiding sheets from the bottom of a stack in said receiving tray to said exposure platen with the selected side facing the platen and then onto the top of such stack with the selected side facing upwardly;

a registration member mounted adjacent to said exposure platen for movement between a first position, prior to exposure, wherein the member blocks sheet movement along the path to register sheets at said exposure platen, and a second position, after exposure, wherein the member is positioned out of the path;

at least one continuously rotating feed roller mounted to engage a sheet in the path at said exposure platen for driving the sheet along the path;

means disposed adjacent to said receiving tray for separating sheets one at a time from the bottom of the stack and feeding such separated sheets along the path into contact with said feed roller, such roller driving a separated sheet against said member when such member is in its first position to register such sheet at the exposure platen and driving said sheet along said path towards the stack after said member has moved to its second position;

means for exposing a sheet at said platen;

a photoconductive member remote from said platen;

means for projecting an image of a sheet at the platen onto said photoconductive member;

means associated with said photoconductive member for forming on a copy sheet an image of the selected side of a document sheet; and means for delivering the copy sheets in the order copies are made and with the image side of each copy sheet facing in the same direction and with the second of any two adjacent copy sheets being positioned against the image side of the preceeding sheet whereby the copy sheets are arranged in the same order as the document sheets.

9. A copier as set forth in claim 8 further including means for sensing each time the document sheet, which was upper-most in the stack when first placed in said tray, is fed from the tray to the platen for exposure, and means for deactivating the feeder after the desired number of copies of the entire stack has been made.

* * * * *